(12) United States Patent
Miyauchi et al.

(10) Patent No.: US 7,690,728 B2
(45) Date of Patent: Apr. 6, 2010

(54) VEHICLE SEAT APPARATUS

(75) Inventors: Yukie Miyauchi, Chiryu (JP); Naoki Niimi, Nagoya (JP); Kenji Maeda, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 659 days.

(21) Appl. No.: 11/582,405

(22) Filed: Oct. 18, 2006

(65) Prior Publication Data

US 2007/0090674 A1    Apr. 26, 2007

(30) Foreign Application Priority Data

Oct. 21, 2005    (JP) .............................. 2005-307485

(51) Int. Cl.
*B60N 2/02* (2006.01)
(52) U.S. Cl. .................. 297/378.12; 297/362; 297/366; 297/367
(58) Field of Classification Search ............ 297/378.12, 297/362, 366, 367
See application file for complete search history.

(56) References Cited

U.S. PATENT DOCUMENTS

| 5,927,809 | A | * | 7/1999 | Tame ......................... 297/341 |
| 6,106,067 | A | * | 8/2000 | Zhuang et al. ............ 297/361.1 |
| 6,336,679 | B1 | | 1/2002 | Smuk |
| 6,601,921 | B1 | * | 8/2003 | Collins .................. 297/378.12 |
| 6,799,801 | B2 | * | 10/2004 | Niimi et al. ............ 297/378.12 |
| 6,910,739 | B2 | * | 6/2005 | Grable et al. .......... 297/378.12 |
| 7,134,724 | B2 | * | 11/2006 | Chabanne et al. ........... 297/366 |
| 7,380,885 | B2 | * | 6/2008 | Fischer et al. .......... 297/378.12 |
| 7,387,333 | B2 | * | 6/2008 | Seibold ........................ 297/15 |
| 7,393,056 | B2 | * | 7/2008 | O'Connor .............. 297/378.12 |
| 7,434,883 | B2 | * | 10/2008 | Deptolla ...................... 297/341 |
| 7,478,882 | B2 | * | 1/2009 | Fischer et al. .......... 297/378.12 |
| 7,503,099 | B2 | * | 3/2009 | Pejathaya ..................... 16/324 |

FOREIGN PATENT DOCUMENTS

JP    2002-501852 A    1/2002
JP    2003-182416 A    7/2003

* cited by examiner

*Primary Examiner*—Laurie K Cranmer
(74) *Attorney, Agent, or Firm*—Buchanan Ingersoll & Rooney PC

(57) ABSTRACT

A vehicle seat apparatus includes a lower arm, an upper arm being rotatable relative to the lower arm in a front-rear direction of a vehicle seat, a pressing member fixed at the upper arm, a base member fixed at the lower arm, a first link supported by the base member so as to be rotatable and having a stopper pin positioned on a rotation path of the pressing member when a walk-in operation is performed and positioned out of the rotation path of the pressing member when a tilt-down operation is performed; and a second link rotatably supported by the first link and maintaining the stopper pin so as to be one of on and out of the rotation path of the pressing member, the second link being provided in a manner where a rotational axis thereof is coaxial to a central axis of the stopper pin.

14 Claims, 9 Drawing Sheets

VEHICLE SEAT APPARATUS

CROSS REFERENCE TO RELATED APPLICATIONS

This application is based on and claims priority under 35 U.S.C. §119 to Japanese Patent Application 2005-307485, filed on Oct. 21, 2005, the entire content of which is incorporated herein by reference.

FIELD OF THE INVENTION

The present invention relates to a vehicle seat apparatus having a walk-in mechanism and a tilt-down mechanism.

BACKGROUND

Automotive vehicles, especially a two-door type vehicle has a known walk-in mechanism by which a seat back of a front seat, provided at a front low, is tilted forward, while a passenger gets in and out of a rear seat of the vehicle, at the same time, the walk-in mechanism disengages a lock mechanism of a seat slide mechanism in order to adjust the position of the seat in a front-rear direction thereof, so that it becomes easy for the passenger to access to the rear seat.

Besides the walk-in mechanism, such two-door type vehicle also has a tilt-down mechanism by which the seat back of the front seat is significantly tilted forward so that, when a rear compartment of the vehicle is used as a luggage space, it becomes easy to get a luggage into and out of the luggage space.

According to U.S. Pat. No. 6,336,679B1, a vehicle seat apparatus includes a mechanism for switching between a walk-in operation and a tilt-down operation. Specifically, a first operation lever is activated in order to execute the walk-in operation, and a second operation lever is activated in order to execute the tilt-down operation.

However, according to the mechanism disclosed in U.S. Pat. No. 6,336,679B1, when the seat being in the tilt-down state is restored to its original position, it is necessary for the passenger to activate the operation lever again. Further, parts configuring the abovementioned mechanism scatter within a reclining unit, which is used for adjusting the angle of the seat back, and a walk-in mechanism or the like is not provided as a unit independently. Thus, it is limited to secure a space in which the walk-in mechanism is provided. Further, a walk-in stopper for regulating the seat back at a predetermined angle is not provided within the walk-in in mechanism, and a protruding portion provided at the side flame serves as the walk-in stopper. Thus, flexibility in design of the seat back is significantly limited.

Another mechanism of the vehicle seat apparatus for switching between a walk-in operation and a tilt-down operation has been disclosed in JP2003182416A. Specifically, the mechanism detects a case when the walk-in operation is executed and a case when the tilt-down operation is executed by detecting a position of a seat cushion by means of a sensor link.

It is based on the premise that such mechanism disclosed in JP2003182416A is applied to a double fold type seat, whose seat cushion can be moved; however, it also can be mounted to a seat whose seat cushion is not moved (a tilt-down type seat or a fixed-type seat), if the sensor link is replaced to an appropriate link by which an operation force is inputted.

According to the vehicle seat apparatus disclosed in JP2003182416A, a central axis of a walk-in stopper pin provided at the main link is not coaxial to a rotational axis of the sensor link for maintaining the walk-in stopper pin on or out of the rotation path of the pressing member. Thus, because the sensor link, which is formed in a long shape, needs to be rotated relative to the rotational axis thereof, it is necessary to provide an additional space, as a result, the size of the seat apparatus is increased.

According to the vehicle seat apparatus disclosed in JP2003182416A, the rotational axis of the main link functioning as a stopper for the walk-in operation is coaxial to a rotational axis of the sub link for unlocking the lock mechanism of the seat slide mechanism, and a rotational axis of the sensor link is not coaxial to the rotational axes of the sub link and the main link. The sensor link can be replaced to an appropriate link by which an operation force is inputted in order to move the walk-in stopper pin so as to be out of the rotation path of the pressing member. Thus, because the main link and the sub link need are rotated relative to the rotational axis, and the sensor link is rotated relative to the other rotational axis, an additional space needs to be provided, as a result, the size of the vehicle seat apparatus is increased.

A need thus exists to provide a more compact vehicle seat apparatus.

SUMMARY OF THE INVENTION

According to an aspect of the present invention, a vehicle seat apparatus includes a lower arm, an upper arm being rotatable relative to the lower arm in a front-rear direction of a vehicle seat, a pressing member fixed at the upper arm, a base member fixed at the lower arm, a first link supported by the base member so as to be rotatable and having a stopper pin positioned on a rotation path of the pressing member when a walk-in operation is performed and positioned out of the rotation path of the pressing member when a tilt-down operation is performed; and a second link rotatably supported by the first link and maintaining the stopper pin so as to be one of on and out of the rotation path of the pressing member, the second link being provided in a manner where a rotational axis thereof is coaxial to a central axis of the stopper pin.

According to another aspect of the present invention, a vehicle seat apparatus includes a lower arm, an upper arm being rotatable relative to the lower arm in a front-rear direction of a vehicle seat, a base member fixed at the lower arm, a first link rotatably supported by the base member and functioning as a stopper when a walk-in operation is performed, a third link rotatably supported by the base member and unlocking a lock mechanism of a seat slide mechanism and a fourth link rotatably supported by the base member and executing one of a tilt-down operation when the vehicle seat apparatus is in a walk-in state and the walk-in operation when the vehicle seat apparatus is in a tilt-down state, wherein the first link, the third link and the fourth link are positioned so as to be coaxially rotatable relative to a rotational axis thereof.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

First Embodiment

Figure 1:
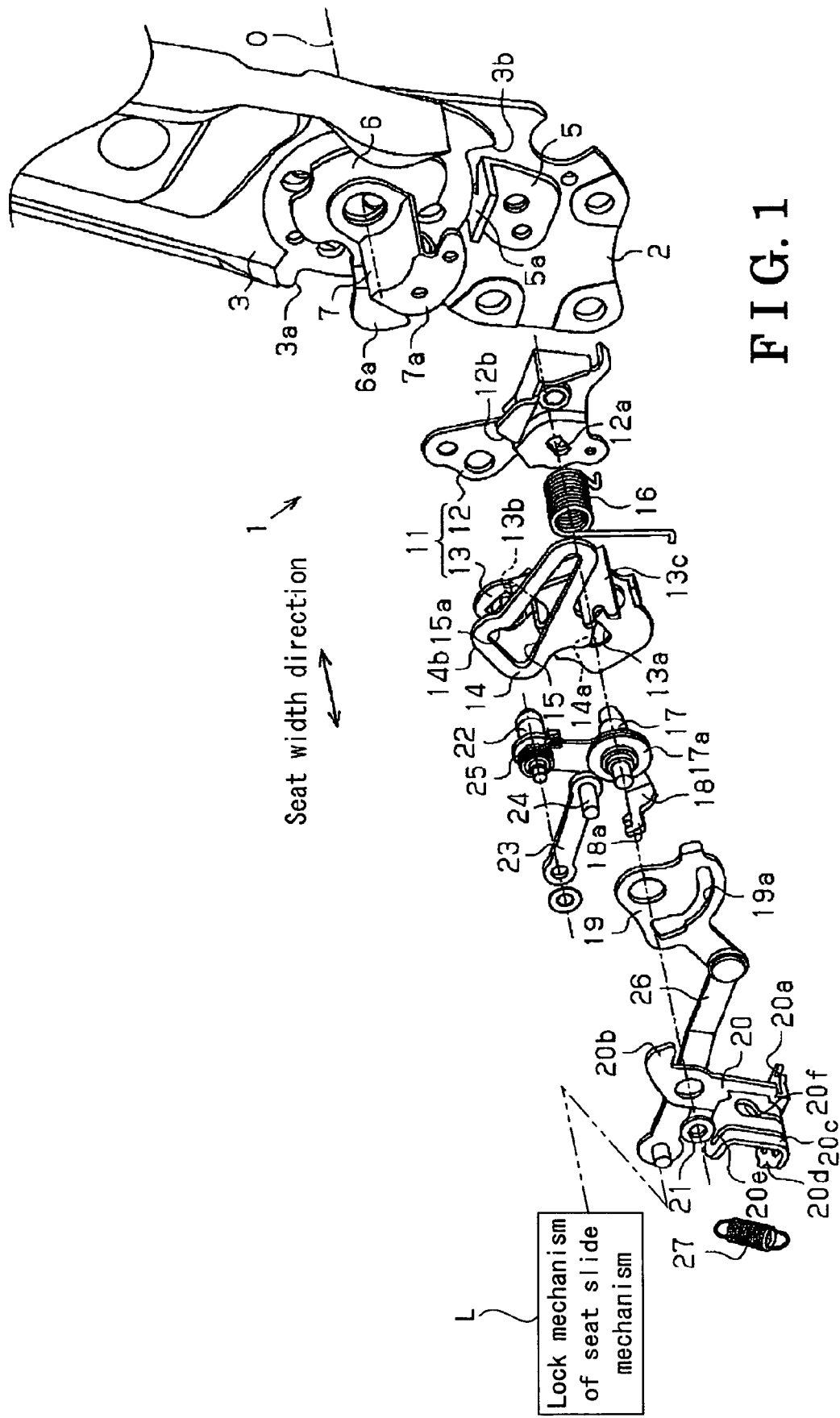
FIG. 1 illustrates an exploded perspective view of the vehicle seat apparatus according to the first embodiment.
Figure 9:
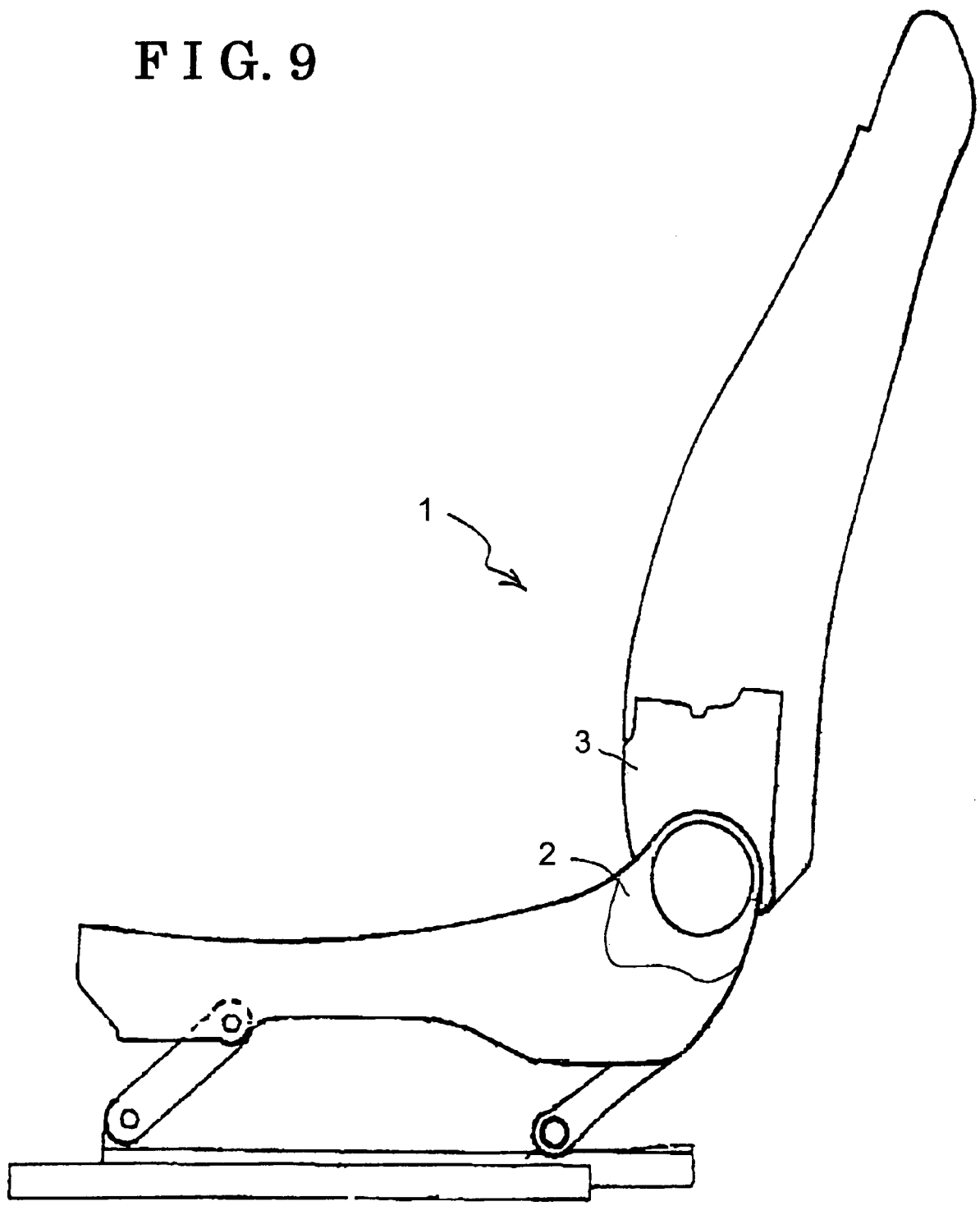
FIG. 9 illustrates a side view indicating an entire vehicle seat apparatus according to the embodiments of the present invention.

A first embodiment according to the present invention will be explained in accordance with the attached drawings. FIG. 1 illustrates a part of a vehicle seat apparatus 1 according to the present invention illustrated in FIG. 9, specifically illustrates an exploded perspective view of the vehicle seat apparatus 1, decomposed in a seat width direction.

As shown in FIG. 1, a vehicle seat apparatus 1 includes a lower arm 2 made of a board material so as to form a bone structure of a seat cushion and an upper arm 3 made of a board material so as to form a bone structure of a seat back. The upper arm 3 is supported by the lower arm 2 in a manner where the upper arm 3 rotates relative to a rotation axis O in a seat front-rear direction so that the seat back is tilted in a front-back direction of the seat.

The lower arm 2 and the upper arm 3 are provided in pair at each side of the seat in a seat width direction (e.g., the right side and the left side of the seat). FIG. 1 illustrates the lower arm 2 and the upper arm 3 provided at the right side of the vehicle seat facing a front direction thereof. Further, a reclining mechanism (not shown) is provided between the lower arm 2 and the upper arm 3 in order to adjust an angle of the seat back relative to the rotation axis O.

On an inner surface of the lower arm 2, a reclining stopper 5, which is made of a plate material is joined at below the upper arm 3. At the reclining stopper 5, a stopper portion 5a is formed so as to protrude in a manner where it extends inward from the lower arm 2 in a seat width direction.

At the upper arm 3, a first stopper plate portion 3a is formed at one side in a circumferential direction of the rotation axis O (at the side of a clockwise direction in FIG. 1) so as to protrude outward in a radial direction of the rotation axis O, and a second stopper plate portion 3b is formed at the other side of a circumferential direction of the rotation axis O (at the side of a clockwise direction in FIG. 1) so as to protrude outward in a radial direction of the rotation axis O.

The stopper portion 5a is positioned on a rotation path of the first stopper plate portion 3a and the second stopper plate portion 3b. In this configuration, when the tilt-down operation is performed, the seat back is significantly rotated forward, and the first stopper plate portion 3a regulates a rotational angle of the upper arm 3 relative to the lower arm 2. The second stopper plate portion 3b regulates a rotational angle of the upper arm 3 relative to the lower arm 2 when the seat back is rotated backward.

On the inner surface of the upper arm 3, a pressing member 6, which is made of a plate material, is joined at a circumference of the rotation axis O.

At the pressing member 6, a pressing portion 6a is formed in a manner where it protrudes outward in a radial direction of the rotation axis O at between the first stopper plate portion 3a and the second stopper plate portion 3b so as to be distanced inward from the upper arm 3 in a seat width direction.

Further, on the inner surface of the upper arm 3, a guide member 7, which is made of a plate material is joined at the circumference of the rotation axis O. At the guide member 7, a guide portion 7a is formed so as to protrude outward in a radial direction of the rotation axis O. Specifically, the guide portion 7a is distanced from the upper arm 3 further inward relative to the pressing portion 6a in a seat width direction.

The guide portion 7a is provided at the side of the second stopper plate portion 3b in a circumferential direction of the rotation axis O more closer to the second stopper plate portion 3b than the pressing portion 6a. Further, in a radial direction of the rotation axis O, a length of the guide portion 7a is set to be shorter than a length of the pressing portion 6a.

Thus, the pressing portion 6a and the guide portion 7a are formed each other in such a manner that each rotation path does not overlaps while the pressing portion 6a and the guide portion 7a are rotated integrally with the upper arm 3.

Further, the pressing member 6 and the guide member 7, each of which has an opening formed in a circle shape relative to the rotation axis O, are connected to the reclining mechanism and a control shaft (not shown) to which an operation for unlocking the reclining mechanism is inputted.

A base member 11 is fixed by means of a fastening member such as a bolt and a nut at the inner surface of the lower arm 2 so as not to interfere with the reclining stopper 5. The base member 11 includes a first base bracket 12 and a second base bracket 13 so as to be integral, and the first base bracket 12 and the second base bracket 13 are provided in pair in a seat width direction. The first base bracket 12 is provided at the inner surface of the lower arm 2 at which the reclining stopper 5 is joined, and the second base bracket 13 is positioned at an inner surface of the first base bracket 12 and fixed at the lower arm 2.

At a central portion of the first base bracket 12, an attachment hole 12a is formed in an approximately rectangular shape so as to open in a seat width direction, and a first stopper piece 12b is formed at the first base bracket 12 in a plate shape so as to protrude upward. The first stopper piece 12b is provided above the attachment hole 12a and between the first stopper plate portion 3a and the pressing portion 6a in a seat width direction.

Figure 2:
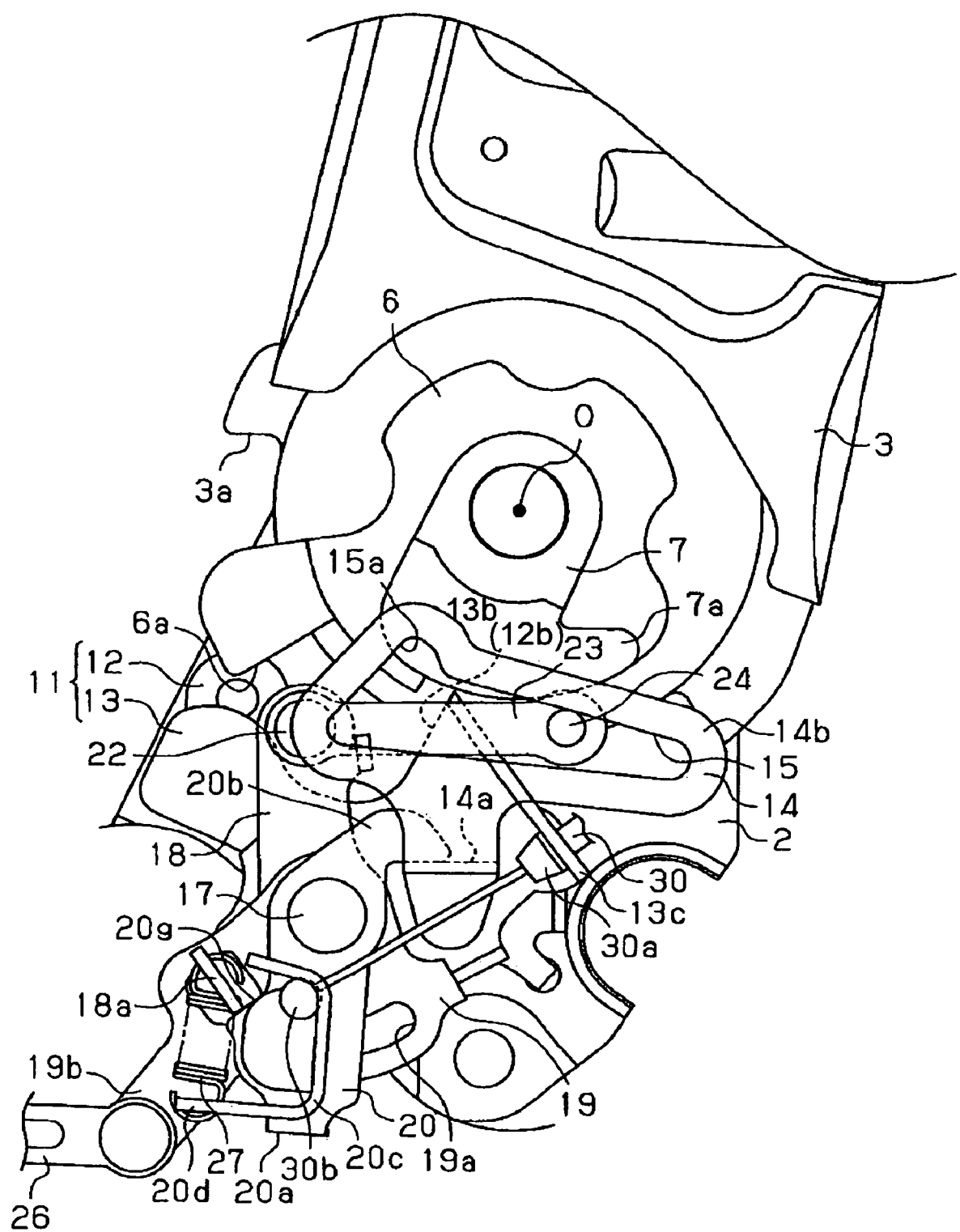
FIG. 2 illustrates a side view indicating a seating state according to the first embodiment.

At a central portion of the second base bracket 13, an attachment hole 13a and a second stopper piece 13b are formed, an attachment hole 13a formed so as to have an approximately rectangular shape cross section and open in a seat direction, and a second stopper piece 13b formed in a plate shape so as to protrude upward. The second stopper piece 13b is provided above the attachment hole 13a at between the pressing portion 6a and the guide portion 7a in a seat width direction. Specifically, the first stopper piece 12b and the second stopper piece 13b are provided so as to be spaced in a manner where the pressing portion 6a is provided between the first stopper piece 12b and the second stopper piece 13b in a seat width direction at the central position therebetween. Further, a cable supporting piece 13c is formed at the second base bracket 13 so as to protrude in a seat width direction. At the cable supporting piece 13c, a metal fitting 30a of a cable 30, which is shown in FIG. 2 is supported.

A sensor bracket 14 (e.g., serving as a bracket) made of a plate material is fixed at a central portion of an inner surface of the second base bracket 13 so as not to interfere with the attachment hole 13a and the like. A stopper wall portion 14a and a guide wall portion 14b are formed at the sensor bracket 14. Specifically, the stopper wall portion 14a protrudes inward from an inner surface of the second base bracket 13 in a seat width direction, and the guide wall portion 14b is bent upward from the stopper wall portion 14a. At the guide wall portion 14b, a long hole 15 and an engagement concave portion 15a are formed. Specifically, the long hole 15 extends in a seat front-rear direction, and the engagement concave portion 15a is formed at one end of the long hole 15 so as to sharply concave upward.

Between the first base bracket 12 and the second base bracket 13, a cable spring 16, which is made of a torsion coil spring, is provided coaxially with each of the attachment hole 12a, the attachment hole 13a. On end of the cable spring 16 engages the first base bracket 12.

A hinge pin 17 is fixed at the base member 11 in a manner where one end of the hinge pin 17 is inserted into both of the attachment hole 13a and a cable spring 16, and then the end fits the attachment hole 12a. The hinge pin 17 is located below the first stopper piece 12b and the second stopper piece 13b.

At a central portion of the hinge pin 17 in an axial direction thereof, a flange 17a is formed integrally with the hinge pin 17 in a manner where it protrudes radially outward relative to the hinge pin 17. Between the flange 17a and a surface of the second base bracket 13, a surface facing the flange 17a, a main link 18 (e.g., serving as a first link) is supported at the central portion of the hinge pin 17 so as to be rotatable at a central portion of the hinge pin. The main link 18 is made of a plate material and formed in an arm shape.

Because a predetermined space is provided between the flange 17a and the surface of the second base bracket 13 (base member 11), the surface at which the hinge pin 17 is fixed, the main link 18 is allowed to smoothly rotate relative to the hinge pin 17.

The main link 18 is provided between the second stopper piece 13b and the guide wall portion 14b in a seat width direction. A sub link 19 (e.g., serving as a third link) fits the hinge pin 17 at an opposite side of the main link 18 in a manner where the hinge pin 17 is inserted into a hole formed on the sub link 19 so that the flange 17a is sandwiched between a sub link 19 and the main link 18. Specifically, the sub link 19 is made of a plate material so as to be formed in a sector shape. Further, a cable link 20 (e.g., serving as an operation link), which is made of a plate material fits the hinge pin 17 in a manner where the hinge pin 17 is penetrated through a hole formed on a cable link 20.

After the hinge pin 17 fits the sub link 19 and the cable link 20, a washer 21 formed in a ring shape is attached at the end of the hinge pin 17 so that the sub link 19 and the cable link 20 is not pulled out of the hinge pin 17. Thus, the sub link 19 and the cable link 20 are supported by the hinge pin 17 so as to be rotatable relative to the hinge pin 17.

The main link 18, the sub link 19 and the cable link 20 are positioned so as to have a coaxial axis at the hinge pin 17. The sub link 19 and a cable link 20 are provided in a manner where predetermined spaces are provided between the washer 21 and the flange 17a so that the sub link 19 and the cable link 20 are allowed to rotate smoothly relative to the hinge pin 17.

A walk-in stopper pin 22 (e.g., serving as a stopper pin) is fixed at one end portion of the main link 18. The walk-in stopper pin 22 is formed in an approximately column shape in a manner where a central shaft thereof extends in a seat width direction. The length of the walk-in stopper pin 22 in an axial direction thereof is set in a manner where, in accordance with the rotation of the main link 18, the walk-in stopper pin 22 connects the first stopper piece 12b and the second stopper piece 13b. Thus, the rotation of the main link 18 relative to the hinge pin 17 is regulated in a manner where the walk-in stopper pin 22 contacts the first stopper piece 12b and the second stopper piece 13b.

A sensor link 23 (e.g., serving as a second link) is rotatably supported by the main link 18 at the opposite side of the walk-in stopper pin 22 in a manner where the sensor link 23 is coaxial to an axial of the walk-in stopper pin 22. The sensor link 23 is made of a plate material and formed in an arm shape.

At one end portion of the sensor link 23, a sensor pin 24 (e.g., serving as a pin) is provided so as to protrude from the side of the second base bracket 13. The sensor pin 24 is provided so as to be inserted into the long hole 15 of the sensor bracket 14.

The sensor pin 24 is biased by means of a sensor spring 25 (e.g., serving as a biasing member), which is made of a coil spring, so as to contact an upper inner wall surface of the long hole 15. One end of the sensor spring 25 engages the main link 18, and the other end of the sensor spring 25 engages the sensor link 23. The guide member 7 is provided in a manner where the guide portion 7a thereof is positioned between the sensor bracket 14 and the sensor link 23 in a seat width direction.

At the other end portion of the main link 18, an engaging piece 18a bending in a seat width direction is formed. The engaging piece 18a is inserted into a long hole 19a formed at the sub link 19 in a long shape extending so as to be in an arch shape. Thus, relative rotations between the main link 18 and the sub link 19 are limited in a manner where the engaging piece 18a engages the inner wall surface of the long hole 19a.

An extending portion 19b is formed in an arm shape at the sub link 19 so as to extend outward in a radial direction thereof, and a connecting link 26 is connected at the end portion of the extending portion 19b. In this configuration, the connecting link 26 makes a reciprocate movement in accordance with a rotation of the sub link 19. Specifically, in conjunction with the actuation of one end of the connecting link 26 pushed forward by the rotation of the sub link 19 relative to the hinge 17 in a clockwise direction in the attached drawings, the lock mechanism L of the seat slide mechanism connected to the other end of the connecting link is actuated in order to unlock the lock mechanism L of the seat slide mechanism. The sub link 19 is normally biased by a biasing means of the seat slide mechanism through the connecting link 26 so as to rotate relative to the hinge pin 17 in an anticlockwise direction in the attached drawings.

At one end portion of the cable link 20, a supporting piece 20a, at which one end of the cable spring 16 is engaged, is formed. The other end of the cable spring 16 is engaged with the first base bracket 12.

At the other end portion of the cable link 20, a hook portion 20b is formed. Specifically, the hook portion 20b is biased in a clockwise direction in the attached drawings relative to the hinge pin 17 so as to engage the stopper wall portion 14a of the sensor bracket 14.

A regulating wall portion 20c and a supporting piece 20d are formed at the cable link 20. The regulating wall portion 20c is formed extending in a seat width direction so as to have a reversed approximate C-shape cross section. One end of a main spring 27 engages an end portion of the engaging piece 18a that is inserted into the long hole 19a, and the other end portion of the main spring 27 engages the supporting piece 20d, which is formed below the regulating wall portion 20c. The main link 18 is biased by the main spring 27 so as to rotate relative to the hinge pin 17 in an anticlockwise direction in the attached drawings.

Further, a long hole 20e is formed at the regulating wall portion 20c, and a ball shaped end portion 30b, which is formed at one end of the cable 30 (shown in FIG. 2), engages the long hole 20e. The cable 30 further includes at the other end thereof a metal fitting 30a that is supported by the cable supporting piece 13c. The long hole 20e is formed so as to extend along the reversed C-shape of the regulating wall portion 20c and bend at a lower end of the regulating wall portion 20c in a U-shape, and further extend so as to continue an attachment hole 20f where the end portion 30b is attached to and detached from.

The cable 30 is attached at the cable link 20 as follows. First, the end portion 30b inserted into the attachment hole 20f is moved downward along the long hole 20e, and the further moved upward so as to engage the end portion of the long hole 20e.

The cable 30 is connected to a tilt-down operation lever, which is not shown in the drawings. When the operation lever is actuated, an operation force is transmitted so that the end portion 30b is pulled so as to rotate the cable link 20 in an anticlockwise direction against the biasing force applied thereto by the cable spring 16.

Further, the main link 18, which is connected to the cable link 20 by means of the main spring 27, is rotated in accordance with the rotation of the cable link 20. An elastic force of the main spring 27 is set at a predetermined level at which the main spring 27 is not substantially deformed when the main link 18 is rotated in accordance with the rotation of the cable link 20.

Figure 3:
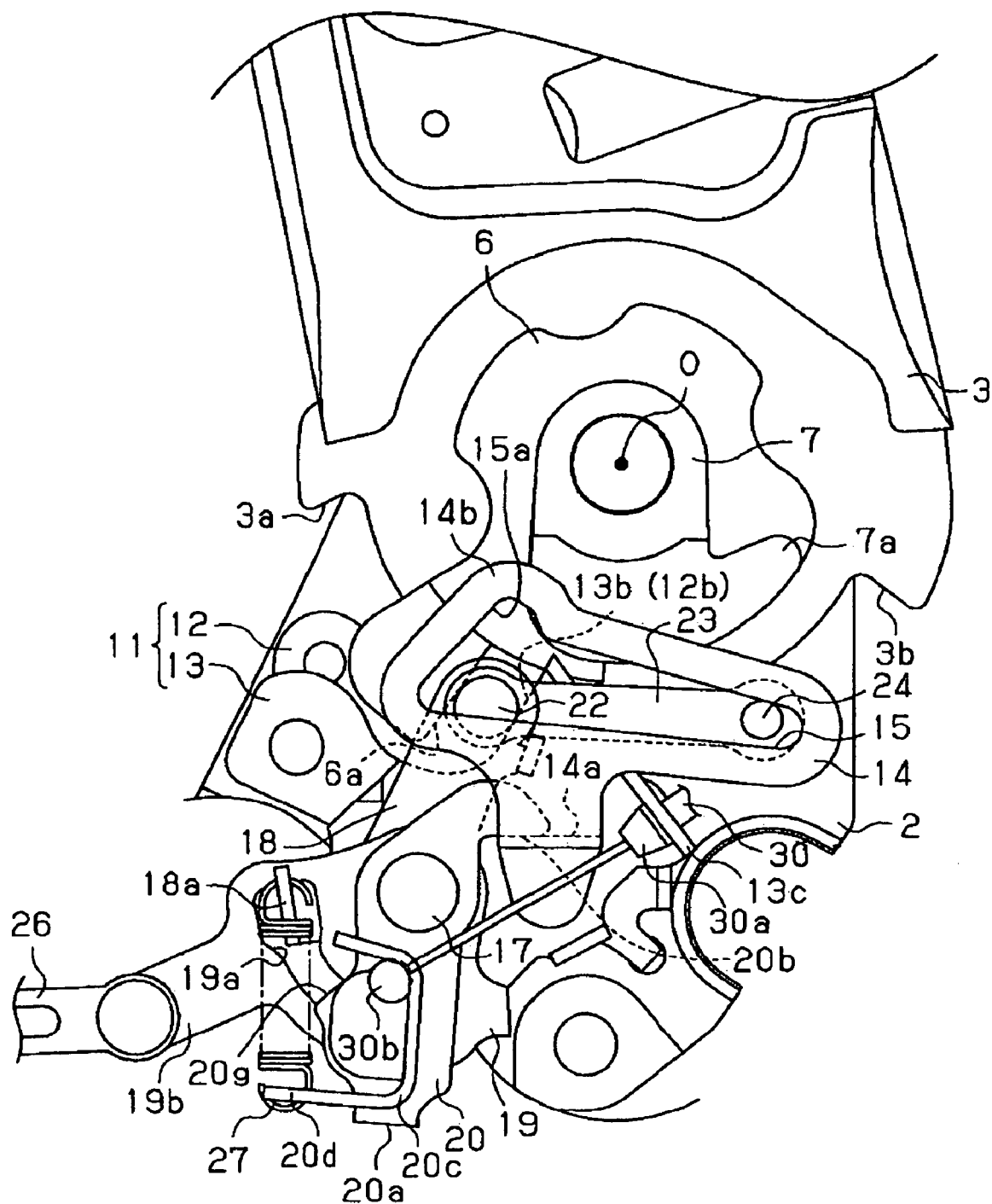
FIG. 3 illustrates a side view indicating a walk-in state and a restored state according to the first embodiment.

An actuation of the vehicle seat apparatus will be explained below. FIG. 2 illustrates a side view indicating the vehicle seat apparatus that is in a seating state, in which a passenger normally seats thereon. FIG. 3 illustrates a side view of the vehicle seat apparatus after a walk-in operation is performed and a restore operation is performed.

Figure 4:
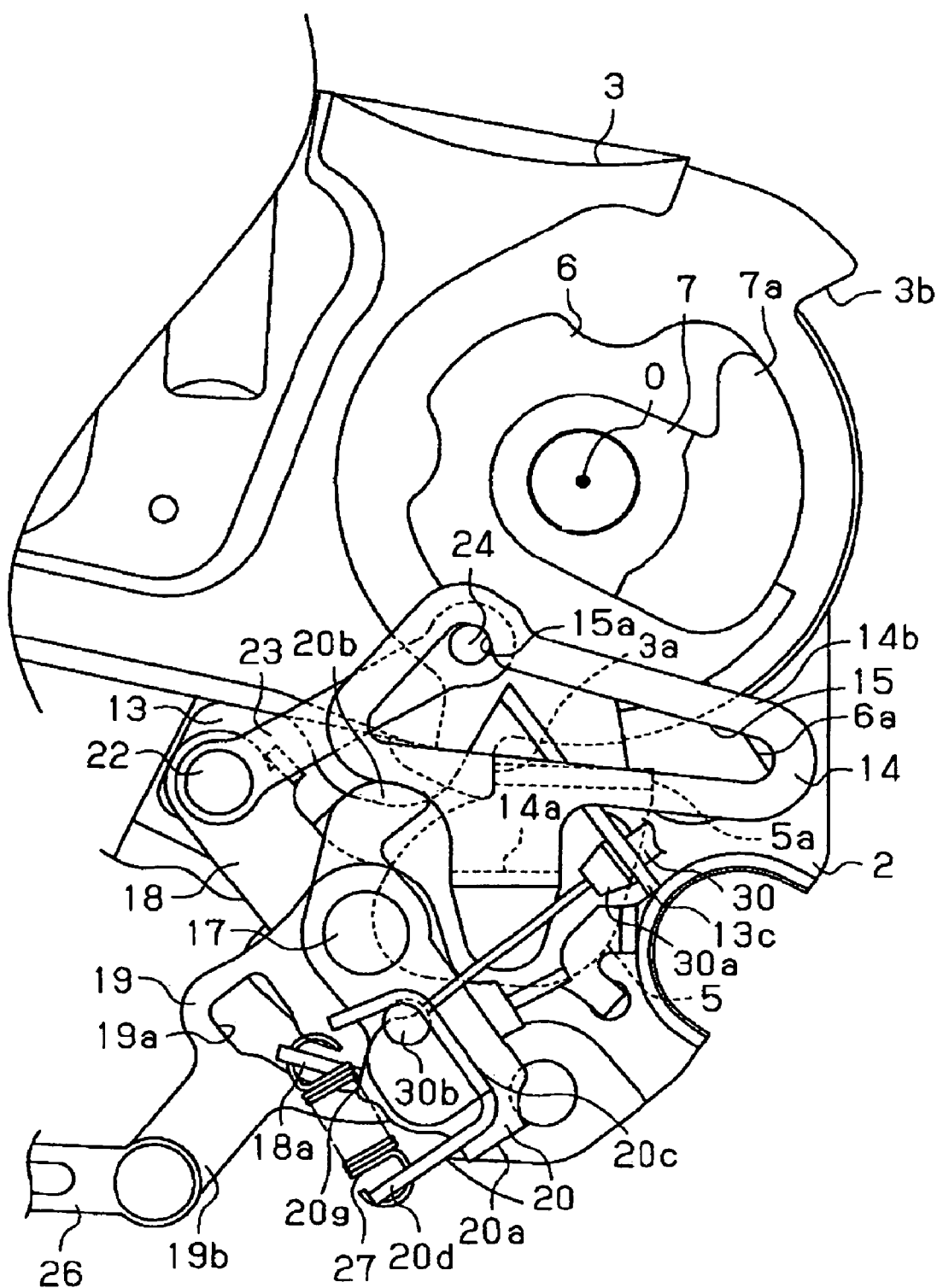
FIG. 4 illustrates a side view indicating a tilt-down state according to the first embodiment.
Figure 5:
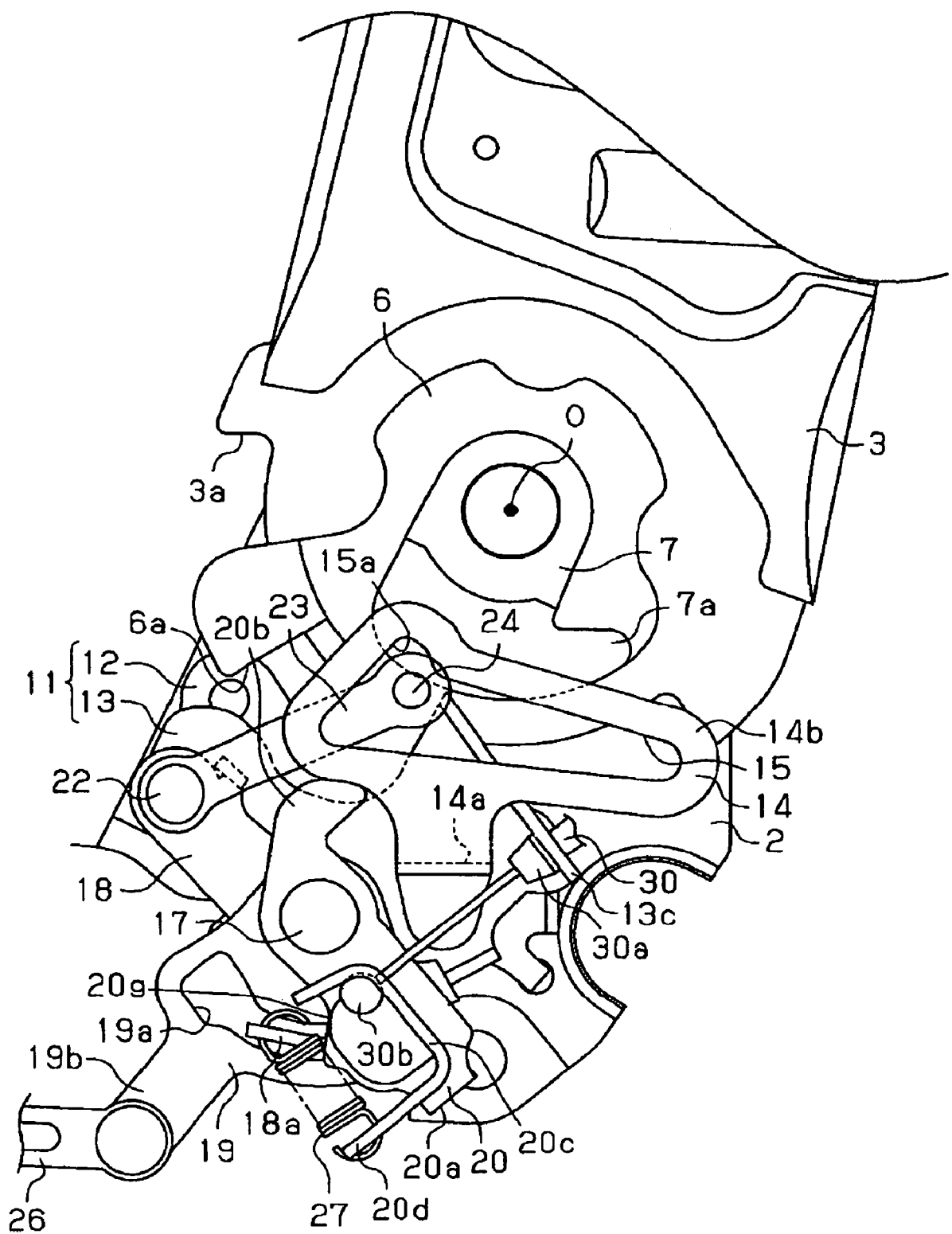
FIG. 5 illustrates a side view indicating a tilt-down operating performing state and a restored state.

FIG. 4 illustrates a side view indicating the vehicle seat apparatus after a tilt-down operation is performed. FIG. 5 illustrates a side view indicating the vehicle seat apparatus during a tilt-down operation is performed and when the restored operation is performed. The seating state of the vehicle seat apparatus illustrated in FIG. 2 is also a walk-in standby state at which the seat back is ready to be tilted forward (rotating the upper arm 3) for the walk-in operation.

As shown in FIG. 2, when the vehicle seat apparatus is in the seating state, because an operation force of the tilt-down operation lever is not transmitted, the cable link 20 is positioned at and maintained by the base member 11 in a manner where the hook portion 20b engages the stopper wall portion 14a of the sensor bracket 14 by means of a biasing force of the cable spring 16.

The cable 30 is provided in a manner where the end portion 30b thereof engaging the end portion of the long hole 20e fits a corner formed at the upper portion of the regulating wall portion 20c.

The main link 18 connected to the cable link 20 by means of the main spring 27 is positioned and maintained in a manner where the engaging piece 18a of the main link 18 engages a cable link stopper portion 20g of the cable link 20 by means of a biasing force of the main spring 27. In other words, the main link 18 is positioned at and maintained by the base member 11 by means of the cable link 20.

The walk-in stopper pin 22 provided at the main link 18 is positioned on a rotation path of the pressing portion 6a relative to the rotation axis O. The sensor pin 24 provided at the sensor link 23 is positioned at a central portion in a longitudinal direction of the long hole 15, and the sensor pin 24 is biased by means of the sensor spring 25 so as to engage an upper inner surface of the long hole 15.

The rotational position of the main link 18 by which the seating state (walk-in standby state) is regulated is for setting a design reference position of the main link 18. Thus, the design reference position at this point is set at a central position within an actuation range of the main link 18 in accordance with a moving range of the sensor pin 24 within the long hole 15.

Further, the sub link 19 biased by the biasing means of the seat slide mechanism through the connecting link 26 is positioned in a manner where the engaging piece 18a is located within the long hole 19a at one side in a circumferential direction thereof (in a clockwise direction within the long hole 19a in the attached drawings).

In this condition, it is assumed that the walk-in operation lever (not shown) is operated, and the operation force transmits in order to unlock the reclining mechanism, and the seat back is leaned forward, and then the upper arm 3 is rotated relative to the rotation axis O in an anticlockwise direction in the attached drawings; the walk-in stopper pin 22 located on the rotation path of the pressing portion 6a is pressed in accordance with the rotation of the pressing portion 6a. Then, the main link 18 rotates in a clockwise direction in the attached drawings, against the biasing force applied thereto by the main spring 27, in a manner where the main link 18 make the sensor pin 24, which is provided at the sensor link 23, slides within the long hole 15 in one direction (right direction in FIG. 2).

Further, as shown in FIG. 3, when the walk-in stopper pin 22 contacts the first stopper piece 12b and the second stopper piece 13b, the pressing portion 6a is regulated by means of the walk-in stopper pin 22 so as not to rotate, and the upper arm 3 is maintained at a predetermined rotational position of the walk-in state.

Thus, the seat back is maintained at a predetermined angle of the walk-in state. Specifically, the main link 18 at which the walk-in stopper pin 22 is provided functions as a stopper when the walk-in operation is performed.

Further, the main link 18 makes the sub link 19 rotate in a clockwise direction in the attached drawings, against the biasing force applied thereto by the biasing means of the seat slide mechanism, in a manner where the engaging piece 18a presses the inner wall surface of the long hole 19a, in accordance with the rotation of the main link 18 in a clockwise direction in the attached drawings.

At this point, the connecting link 26 that is connected to the sub link 19 is pressed so as to move forward, and thus the seat slide mechanism is unlocked in accordance with the rotation of the upper arm 3. In this way, the seat slides forward.

Further, because the cable link 20 is supported by the base member 11 by means of the sensor bracket 14, the above mentioned actuation has no effect on the cable 30.

Furthermore, when the seat being in the walk-in state is restored (restored state), the seat back is moved backward, and the upper arm 3 is rotated in a clockwise direction in the attached drawings relative to the rotation axis O. At this point, because the biasing force is applied by the main spring 27 to the main link 18, the main link 18 is rotated so as to be in the seating state in a manner where the walk-in stopper pin 22 follows the rotation of the pressing portion 6a.

At this point, the main link 18 is positioned and maintained in a manner where the engaging piece 18a contacts the cable link stopper portion 20g. At the same time, when the engaging piece 18a disengages from the long hole 19a, because a biasing force is applied to the sub link 19 by the biasing means of the seat slide mechanism, the sub link 19 is rotated so as to be in the seating state.

In the seating state shown in FIG. 2, when the tilt-down operation lever is operated, and an operation force transmits so as to pull the end portion 30b of the cable 30, the cable link 20 is rotated in an anticlockwise direction in FIG. 1 against the biasing force applied thereto by means of the cable spring 16.

Further, the main link 18 connected to the cable link 20 by means of the main spring 27 make the sensor pin 24 formed at the sensor link 23 slide in the other direction (leftward in FIG. 2) within the long hole 15 so as to rotate together with the cable link 20.

At this point, as shown in FIG. 5, the walk-in stopper pin 22 provided at the main link 18 moves so as to be out of the rotation path of the pressing portion 6a relative to the rotation axis O. However, because the guide portion 7a exists between the sensor pin 24 and the engagement concave portion 15a, the sensor pin 24 does not fit into the engagement concave portion 15a. In this state, the main link 18 is still rotatable relative to the hinge pin 17.

At this point, the reclining mechanism is not unlocked. After the cable 30 is operated so as to be further pulled, the reclining mechanism is unlocked in accordance with the operation of the cable 30.

Next, an actuation of the seat apparatus, when the seat back is leaned forward, and the upper arm 3 is rotated relative to the rotation axis O in an anticlockwise direction in the attached drawings, will be explained. In accordance with the rotation of the guide member 7, the sensor pin 24 is disengaged from the guide portion 7a, as a result, the sensor pin 24 fits the engagement concave portion 15a so that the main link 18 is regulated so as not to rotate and maintained at a predetermined position together with the walk-in stopper pin 22 as shown in FIG. 4. In other words, the main link 18 is positioned at and maintained by the base member 11 by means of the sensor link 23.

In this condition, even when the operation force is not transmitted from the tilt-down operation lever, the walk-in stopper pin 22 is still positioned out of the rotation path of the pressing portion 6a; in other words, the walk-in operation has been canceled. Thus, the walk-in operation is switched to the tilt-down operation the cable link 20 by means of the cable link 20 through which the operation force is transmitted from the operation lever.

While the main link 18 is rotated in an anticlockwise direction in the drawings, the engaging piece 18a moves within the long hole 19a of the sub link 19. At this point, because the main link 18 does not interfere with the sub link 19, the seat slide mechanism is not actuated by the rotation of the main link 18 in an anticlockwise direction in the drawings.

When the seat back is further leaned forward, and the upper arm 3 is further rotated in an anticlockwise direction in the drawings relative to the rotation axis O, the pressing portion 6a is moved backward through between the first stopper piece 12b and the second stopper piece 13b without engaging the walk-in stopper pin 22 positioned out of the rotation path of the pressing portion 6a.

As shown in FIG. 4, the rotation of the stopper portion 5a is limited in a manner where the first stopper plate portion 3a contacts the stopper portion 5a, as a result, the upper arm 3 is maintained at a predetermined position (a predetermined rotational position) of the tilt-down state. Thus, the seat back is maintained at a predetermined angle (predetermined angle position) at which the seat is greatly tilted forward so as to be in the tilt-down state.

On the other hand, when the seat in the tilt-down state is restored, the seat back is leaned backward, and the upper arm 3 is rotated in an clockwise direction in the drawings relative to the rotation axis O. As shown in FIG. 5, in accordance with the rotation of the guide member 7, the sensor pin 24 fitted into the engagement concave portion 15a is pushed off by means of the guide portion 7a from the engagement concave portion 15a. Then, the main link 18 is restored so as to be in the seating state by means of the biasing force applied by the main spring 27.

(1) According to the first embodiment, because the walk-in stopper pin 22 and the sensor link 23 are provided in a manner where a central axis of the walk-in stopper pin 22 is coaxial to the rotational axis of the sensor link 23, when the main link 18 is rotated so that move the walk-in stopper pin 22 is moved so as to be on the rotation path of the pressing member 6 or out of the rotation path of the pressing member 6, the sensor link 23 is moved integrally with the main link 18 relative to the rotational axis that is coaxial to the central axis of the walk-in stopper pin 22. Thus, a space required for allowing the rotation of the main link 18 integrally with the walk-in stopper pin 22 and the sensor link 23 may be provided intensively in the vicinity of its rotational axis. Thus, the vehicle seat apparatus occupies as little space as possible, and limitation of the actuation range in which the main link 18 actuates is reduced.

(2) According to the first embodiment, because a biasing force is applied by the sensor spring 25 to the sensor pin 24 in a manner where the sensor pin 24 is biased toward the engagement concave portion 15a, the walk-in stopper pin 22 positioned out of the rotation path of the pressing member 6 is stably maintained at a predetermined position.

(3) According to the first embodiment, because the main link 18, the sub link 19 and the cable link 20 are positioned in a manner where each rotational axis is provided so as to be coaxial, a space required for allowing the rotations of the main link 18, the sub link 19 and the cable link 20 may be provided intensively in the vicinity of each rotational axis. Thus, the vehicle seat apparatus occupies as little space as possible. Further, because the main link 18, the sub link 19 and the cable link 20, which are related to the walk-in operation and the tilt-down operation, are positioned in a manner where each rotational axis is provided so as to be coaxial, responsivity of the walk-in operation and the tilt-down operation can be improved.

(4) According to the first embodiment, the flange 17a of the hinge pin 17 is provided between the main link 18 and the sub link 19 so that the main link 18, the sub link 19 and the cable link 20 are separated into two parts in an axial direction of the rotational axis; one includes the main link 18 and the other includes the sub link 19 and the cable link 20. Generally, a space is provided between a link and a member, which are adjacent each other in an axial direction of the rotational axis, in order to reduce friction therebetween.

For example, when the main link 18, the sub link 19 and the cable link 20 are provided so as to overlap in an axial direction of the rotational axis, it is necessary to provide a space between the main link 18 and the sub link 19 and provide another space between the sub link 19 and the cable link 20. According to the configuration in the first embodiment, because the flange 17a of the hinge pin 17 is provided between the main link 18 and the sub link 19 so that the main link 18, the sub link 19 and the cable link 20 are separated into two parts, a total of the spaces provided therebetween in an axial direction of the rotational axis is reduced. Further, chances that an axial misalignment of each link, which is caused by the existences of the spaces, can be reduced.

(5) According to the first embodiment, the design reference position of the main link 18 is set at the central position of the actuation range in which the main link 18 is actuated. Thus, the design reference position can be flexibly changed to any position within the actuation range of the main link 18, for example by changing the shape of the hook portion 20b of the cable link 20 that engages the stopper wall portion 14a of the sensor bracket 14. In this configuration, flexibility in design is enhanced, as a result, versatility to the vehicle seat apparatus 1 can be improved.

(6) According to the first embodiment, components such as the main link 18 related to the walk-in operation and the tilt-down operation are integrated as a unit on the basis of the base member 11. Thus, mountability to the lower arm 2 is improved.

Second Embodiment

A Second embodiment according to the present invention will be explained in accordance with the attached drawings. A vehicle seat apparatus of the second embodiment has approximately the same configuration as that of the first embodiment. However, in the second embodiment, the seating state is explained as a tilt-down standby state. In the drawings, the same numerals as that of the first embodiment are used for the same components. The second embodiment will be explained focusing on the difference between the first embodiment and the second embodiment.

Figure 6:
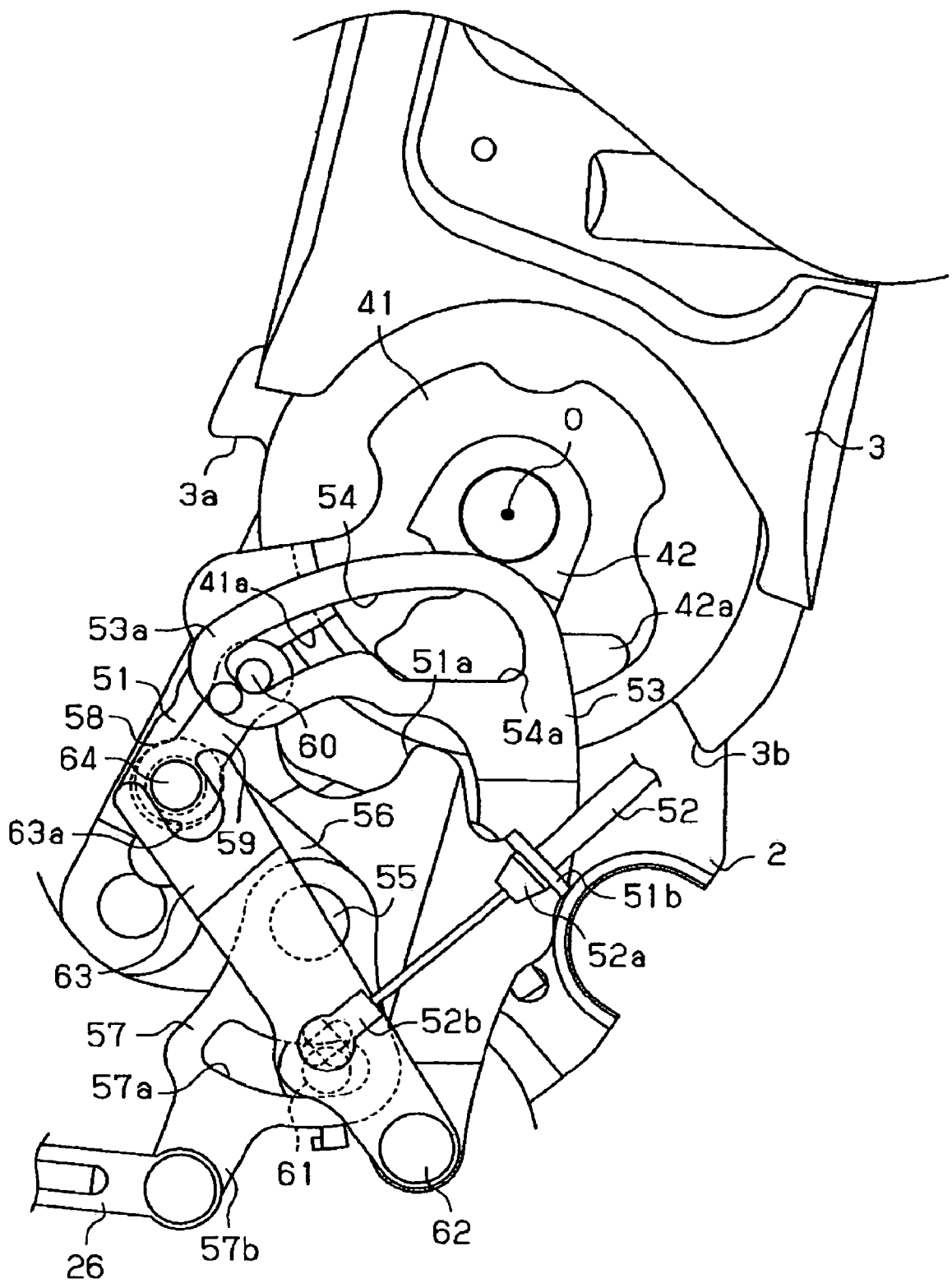
FIG. 6 illustrates a side view indicating a seating state according to the second embodiment.

FIG. 6 illustrates a side view of the vehicle seat apparatus according to the second embodiment when it is in a seating state, which is also a tilt-down standby state. As shown in FIG. 6, on an inner surface of the upper arm 3 in a seat width direction, a pressing member 41 made of a plate material is joined at circumference of the rotation axis O. At the pressing member 41, a pressing portion 41a is formed in a manner where it protrudes outward in a radial direction relative to the rotation axis O at between the first stopper plate portion 3a and the second stopper plate portion 3b so as to be distanced inward from the upper arm 3 in a seat width direction (near side in an orthogonal direction relative to FIG. 6).

Further, on the inner surface of the upper arm 3 at which the pressing member 41 is joined, the guide member 42 made of a plate material is joined at circumference of the rotation axis O. A guide portion 42a is formed at the guide member 42 so as to protrude outward in a radial direction of the rotation axis O in a manner where the guide portion 42a is distanced from the upper arm 3 in a seat width direction further inward relative to the pressing portion 41a.

In a circumferential direction of the rotation axis O, the guide portion 42a is positioned at the side of the second stopper plate portion 3b relative to the pressing portion 41a. The length of the guide portion 42a relative to the rotation axis O in a radial direction is set to be shorter than the length of the pressing portion 41a relative to the rotation axis O in a radial direction. Thus, the pressing portion 41a and the guide portion 42a are formed in a manner where the rotation path of the pressing portion 41a and the rotation path of the guide portion 42a are not overlapped each other both in a radial direction and in a seat width direction.

Further, each of the pressing member 41 and the guide member 42 has an opening formed in a circle shape relative to the rotation axis O, and a reclining mechanism and a control shaft (not shown), by which an operation force is inputted in order to unlock the reclining mechanism, are connected to the opening.

On the inner surface of the lower arm 2, the base member 51 is fixed by means of fastening members such as a bolt and a nut. At the base member 51, a stopper piece 51a formed in a plate shape so as to protrude upward is formed. The stopper piece 51a is provided between the first stopper plate portion 3a and the pressing portion 41a in a seat width direction. On the base member 51, a cable supporting piece 51b is formed so as to protrude in a seat width direction, and a metal fitting 52a of the cable 52 is supported by the cable supporting piece 51b.

On the central portion of the inner surface of the base member 51, a sensor bracket 53 made of a plate material is fixed. The sensor bracket 53 is formed so as to protrude from the inner surface of the base member 51 inward in a seat width direction, and at an end portion of the sensor bracket 53, a guide wall portion 53a is formed so as to bend upward. At the guide wall portion 53a, a long hole 54a is formed so as to extend in a seat front-rear direction. Further, at one side (right-hand in FIG. 6) of the long hole 54, an engagement concave portion 54a is formed so as to be concaved downward in a manner where it has a flat portion at the bottom thereof.

At the base member 51, a hinge pin 55 is fixed in a manner where an axis line thereof extends in a seat width direction. At a central portion of the hinge pin 55 in a seat width direction, a main link 56 (e.g., serving as a first link) made of a plate material so as to be formed in an arm shape is rotatably supported. The main link 56 is biased by means of a spring, which is not shown in the diagrams, so as to rotate in an anticlockwise direction in the drawings, and the main link 56 is positioned and maintained in a manner where it contacts the base member 51. As shown in the attached drawings, the hinge pin 55 is located below the stopper piece 51a. Further, the main link 56 is provided between the stopper piece 51a and the guide wall portion 53a in a seat width direction.

At the hinge pin 55, a sub link 57 made of a plate material so as to be formed in a sector shape is rotatably supported in a manner where it overlaps the main link 56. Specifically, the main link 56 and the sub link 57 are provided in a manner where each of the sub link 57 and the main link 56 has an coaxial rotational axis at the hinge pin 55.

At one end portion of the main link 56, a walk-in stopper pin 58 (e.g., serving as a stopper pin) is fixed, a walk-in stopper pin 58 formed in an approximately column shape in a manner where its central axis extends in a seat width direction. A length of the walk-in stopper pin 58 in an axial direction thereof is set in a manner where the walk-in stopper pin 58 contacts the stopper piece 51a in accordance with the rotation of the main link 56. Thus, the rotation of the main link 56 relative to the hinge pin 55 is regulated in a manner where the walk-in stopper pin 58 contacts the stopper piece 51a.

At the main link 56, a sensor link 59 (e.g., serving as a second link), which is made of a plate material so as to be in an arm shape, is rotatably supported at the opposite side of the walk-in stopper pin 58. A rotational axis of the sensor link 59 is coaxial to the axis of the walk-in stopper pin 58.

At the end portion of the sensor link 59, a sensor pin 60 is provided so as to protrude in a seat width direction. The sensor pin 60 is penetrated through the long hole 54 of the sensor bracket 53 from the side of the base member 51. The sensor pin 60 is biased so as to contact the lower inner wall surface of the long hole 54 by means of the sensor spring, which is provided in a manner where one end thereof engages the main link 56 and the other end thereof engages the sensor link 59. The guide portion 42a of the guide member 42 is provided between the sensor bracket 53 and the sensor link 59 in a seat width direction.

At the other end portion of the main link 56, an engaging pin 61 formed so as to protrude in a seat width direction is fixed. The engaging pin 61 is penetrated through a long hole 57a, which is formed at the sub link 57 so as to be in a arch shape extending relative to the hinge pin 55. Thus, relative rotations of the main link 56 and the sub link 57 are regulated in a manner where the engaging pin 61 engages the inner wall surface of the long hole 57a.

At the sub link 57, an extending portion 57b, which is formed in an arm shape so as to extend outward in a radial direction of the sub link 57, is formed. At the end portion of the extending portion 57b, a connecting link 26 is connected so as to be rotatable. In this configuration, the sub link 57 presses the connecting link 26 in accordance with the rotation of the sub link 57 in a clockwise direction in the attached drawings relative to the hinge 55, in order to unlock of the lock mechanism L of the seat slide mechanism. The sub link 57 is biased by means of a biasing means of the seat slide mechanism through the connecting link 26 so as to rotate relative to the hinge pin 55 in an anticlockwise direction.

At the base member 51, a hinge pin 62 is fixed below the hinge pin 55, and at the hinge pin 62, a cable link 63, which is made of a plate material so as to be in an arm shape, is rotatably supported. At the end portion of the cable link 63, a U-shaped engage piece 63a is formed. Specifically, an engage pin 64 is formed at the main link 56 at the opposite side of the walk-in stopper pin 58 in a manner where a central axis of the engage pin 64 is coaxial to that of the walk-in stopper pin 58, and the engage pin 64 engages the engage piece 63a. Thus, a posture of the cable link 63 is regulated in a manner where the cable link 63 rotates relative to the hinge pin 62 in accordance with the rotation of the main link 56 relative to the hinge pin 55.

At the central portion of the cable link 63 in a longitudinal direction thereof, an end portion 52b of a cable 52 is connected. The cable 52 has a metal fitting 52a, which is supported by the cable supporting piece 51b. The cable 52 is connected to a walk-in operation lever, which is not shown in the drawings; and when the walk-in operation lever is operated, an operation force is transmitted through the cable 52 so as to pull the end portion 52b, as a result, the cable link 63 is rotated in a clockwise direction in the attached drawings relative to the hinge pin 62. In accordance with the rotation of the cable link 63, the main link 56 connected thereto by means of the engage pin 64 is integrally rotated relative to the hinge pin 55 against the biasing force applied to the main link 56 by means of the spring.

Figure 7:
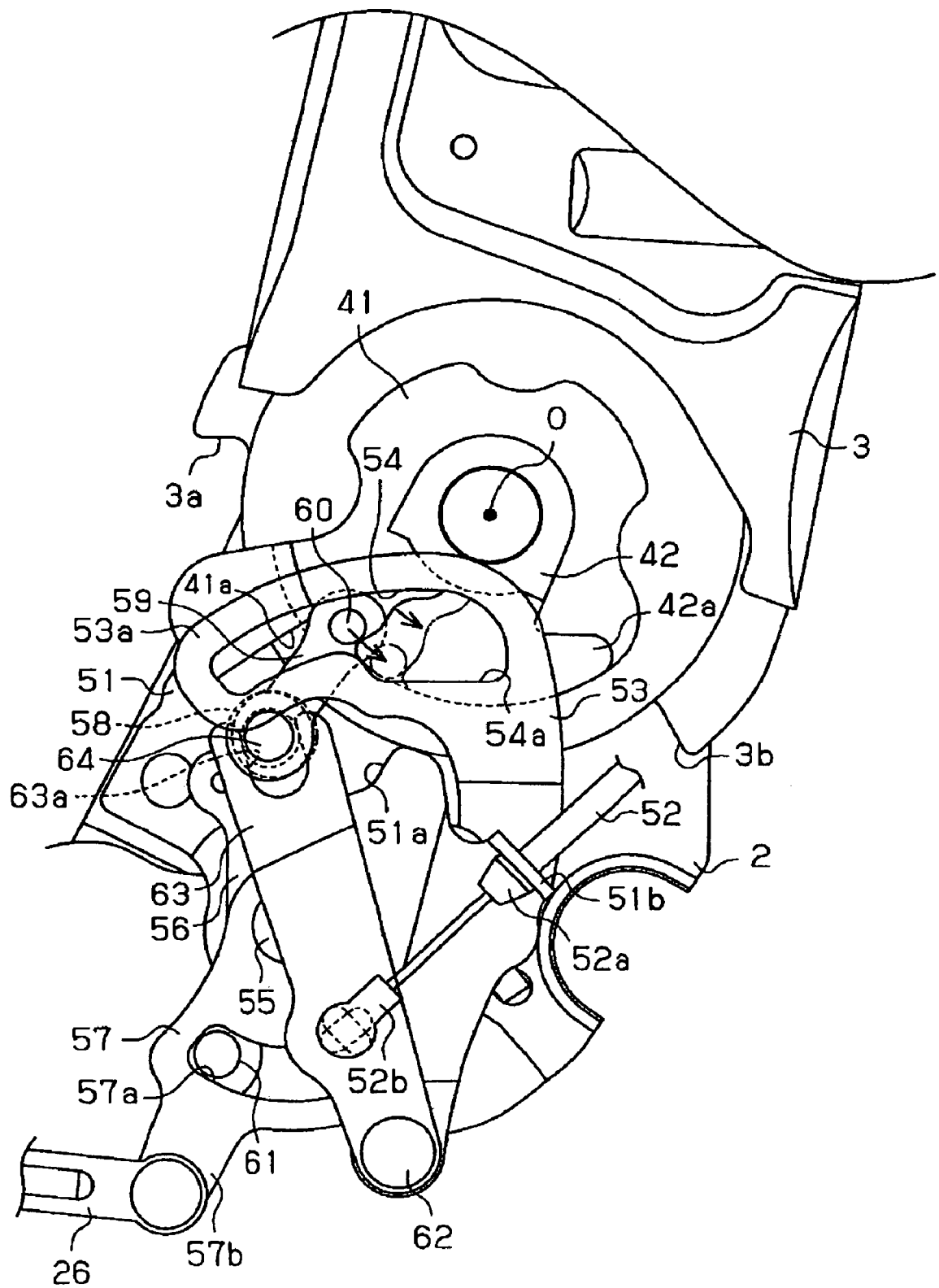
FIG. 7 illustrates a side view indicating the walk-in standby state according to the second embodiment.
Figure 8:
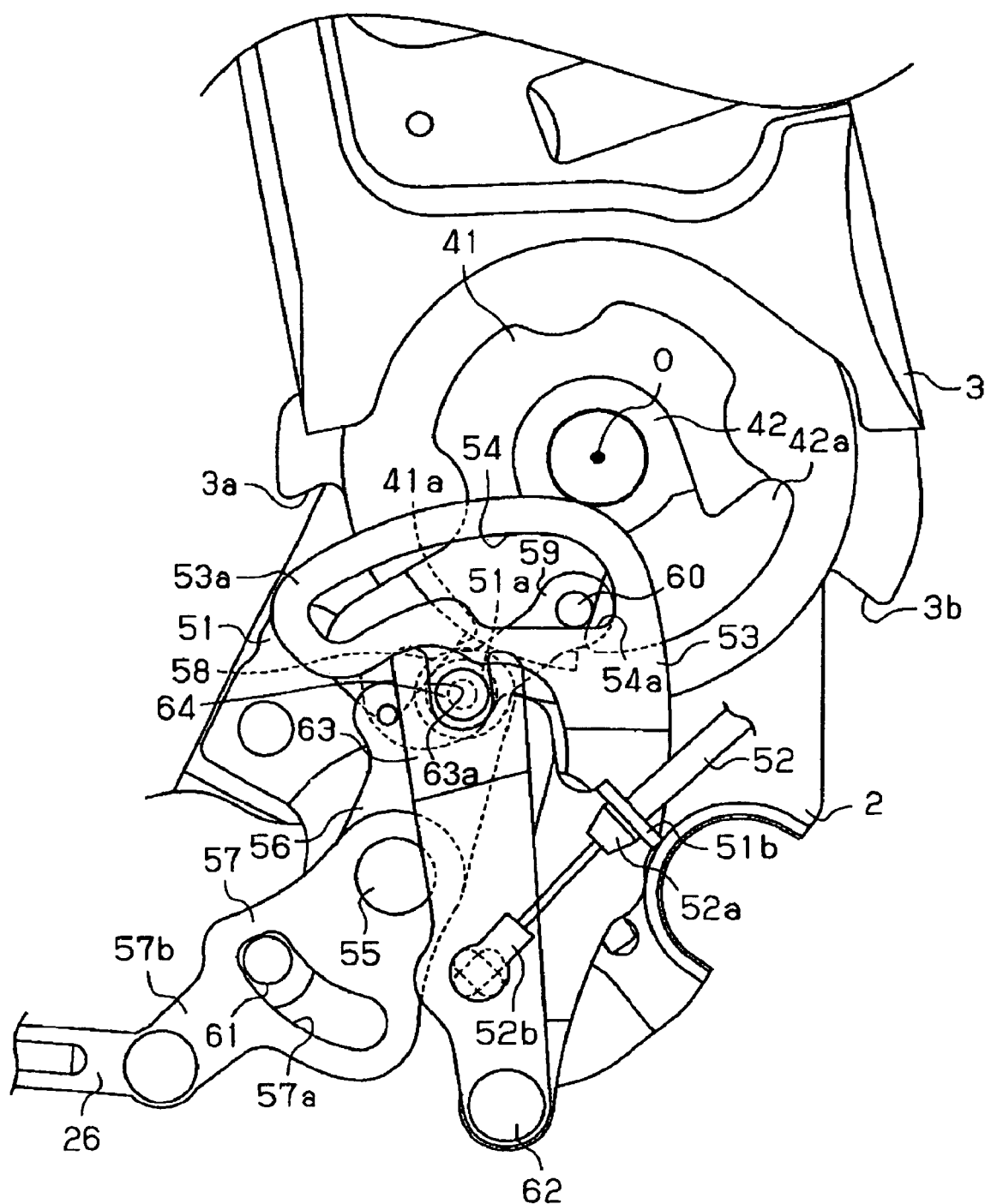
FIG. 8 illustrates a walk-in state according to the second embodiment.

Next, an actuation of the vehicle seat apparatus according to the second embodiment will be explained. As described above, FIG. 6 illustrates a side view indicating a seating state, which is also a tilt-down standby state. FIG. 7 illustrates a side view indicating the walk-in standby state, and FIG. 8 illustrates a walk-in state.

As shown in FIG. 6, when the vehicle seat apparatus is in the seating state, because the operation force of the walk-in operation lever is not transmitted, the main link 56 is positioned and maintained in a manner where the main link 56 is biased by means of the spring so as to contact the base member 51. At this point, the walk-in stopper pin 58 provided at the main link 56 is positioned out of the rotation path of the pressing portion 41a relative to the rotation axis O. The sensor pin 60 provided at the sensor link 59 is provided at one end of the long hole 54 in a longitudinal direction thereof (left end in FIG. 6), and the sensor pin 60 is biased by the above mentioned sensor spring so as to contact the lower inner wall surface of the long hole 54. The rotational position of the main link 56 when the vehicle seat apparatus is in the seating state (tilt-down standby state) is for regulating the design reference position of the main link 56. Thus, the design reference position of the main link 56 is set at one end of an actuation range of the main link 56 in accordance with the moving range of the sensor pin 60 within the long hole 54.

Further, the sub link 57 to which the biasing force is applied by the biasing means of the seat slide mechanism through the connecting link 26 is provided in a manner where the engaging pin 61 is located at one end portion of the long hole 57a in a circumferential direction (one end in an anticlockwise direction relative to the hinge pin 55). A posture of the cable link 63, which is connected to the main link 56 by means of the engage pin 64, is regulated by means of the main link 56.

In this state, when the tilt-down operation lever is operated, and an operation force is transmitted from the tilt-down operation lever; the reclining mechanism is unlocked, at the same time, the seat back is tilted forward. Then, when the upper arm 3 is rotated relative to the rotation axis O in an anticlockwise direction, in accordance with the rotation of the upper arm 3, the pressing portion 41a moves backward through the stopper piece 51a without engaging the walk-in stopper pin 58, which is positioned out of the rotation path. Then, the rotation of the first stopper plate portion 3a is regulated in a manner where the first stopper plate portion 3a contacts the stopper portion 5a (see FIG. 1), and the upper arm 3 is maintained at a predetermined rotational position of the tilt-down state. Thus, the seat back is maintained at a predetermined tilt angle position at which the seat back is substantially leaned forward.

On the other hand, when the vehicle seat apparatus is restored from the tilt-down state, the seat back is moved backward, and the upper arm 3 is rotated in a clockwise direction in the attached drawings relative to the rotation axis O, and then the vehicle seat apparatus is restored to the seating state.

Then, when the vehicle seat apparatus is in the seating state as shown in FIG. 6, the walk-in operation lever is operated and an operation force is transmitted from the walk-in operation lever, and the end portion 52b of the cable 52 is pulled, the cable link 63 is rotated in a clockwise direction in the attached drawings. At this point, as shown in FIG. 7, the main link 56 connected to the cable link 63 by means of the engage pin 64 slides the sensor pin 60 within the long hole 54 toward the other end in a longitudinal direction thereof (right side in FIG. 6), and then the main link 56 is rotated integrally with the cable link 63 against the biasing force applied by the spring.

Then, the walk-in stopper pin 58 provided at the main link 56 moves on the rotational path of the pressing portion 41a relative to the rotation axis O. At the same time, because the sensor pin 60 engages the engagement concave portion 54a, the rotation of the main link 56 is further allowed while the walk-in stopper pin 58 is located on the rotation path. Specifically, the cable link 63 inputs the operation for switching from the tilt-down operation to the walk-in operation. Further, the engaging pin 61 moves to the other end portion in a circumferential direction of the long hole 57a of the sub link 57 (a clockwise direction side). After the walk-in stopper pin 58 is moved so as to be on the rotation path, the reclining mechanism is unlocked.

In this state, when the seat back is tilted forward, and the upper arm 3 is rotated in an anticlockwise direction relative to the rotation axis O, the pressing portion 41a presses the walk-in stopper pin 58 located on the rotation path of the pressing portion 41a in accordance with the rotation of the pressing portion 41a. Then, the main link 56 slide the sensor pin 60 provided at the sensor link 59 within the engagement concave portion 54a of the long hole 54 in one direction (right side in FIG. 7), and then the main link 56 is rotated in a clockwise direction in the attached drawings against the biasing force applied to the main link 56 by means of the above mentioned spring. Then, as shown in FIG. 8, when the walk-in stopper pin 58 contacts the stopper piece 51a, the rotation of the pressing portion 41a is limited, and the upper arm 3 is maintained at a predetermined rotational position of the walk-in state. Thus, the seat back is maintained at a predetermined tilt angle position of the walk-in state.

Further, in accordance with the rotation of the main link 56 in a clockwise direction in the attached drawings, the main link 56 rotates the sub link 57 in a clockwise direction in the attached drawings, against the biasing force applied by the biasing means of the seat slide mechanism, in a manner where the engaging pin 61 presses the inner wall surface of the long hole 57a. Thus, the connecting link 26 connected to the sub link 57 is pressed forward, and the seat slide mechanism, which interlocks the rotation of the upper arm 3, is unlocked, as a result, the seat is slid in a front direction.

On the other hand, when the seat being in the walk-in state is restored, the seat back is tilted backward, and the upper arm 3 is rotated in a clockwise direction in the attached drawings relative to the rotation axis O. A biasing force is applied to the main link 56 by means of the spring so that the main link 56 is restored so as to be in the walk-in standby state in a manner where it follows the pressing portion 41a.

The sensor pin 60 engaging the engagement concave portion 54a is guided by means of the guide portion 42a in accordance with the rotation of the guide member 42 so as to be pushed off from the engagement concave portion 54a, and then the main link 56 is positioned and maintained by contacting the base member 51 so as to be in a seating state as shown in FIG. 6. At the same time, the engaging pin 61 disengages the long hole 57a, the sub link 57 restored to be in a seating state in a manner where a biasing force is applied to the sub link 27 by the biasing means of the seat slide mechanism.

According to the second embodiment, because the walk-in stopper pin 58 and the sensor link 59 are provided in a manner where a central axis of the walk-in stopper pin 58 is coaxial to the rotational axis of the sensor link 59, when the main link 56 is rotated so that the walk-in stopper pin 58 is moved so as to be on the rotation path of the pressing member 41 or out of the rotation path of the pressing member 41, the sensor link 59 is moved integrally with the main link 56 relative to the rotational axis that is coaxial to the central axis of the walk-in stopper pin 58. Thus, a space required for allowing the rotation of the main link 56 integrally with the walk-in stopper pin 58 and the sensor link 59 may be provided intensively in the vicinity of its rotational axis. Thus, the vehicle seat apparatus occupies as little space as possible, and limitation of the actuation range in which the main link 56 actuates is reduced.

According to the second embodiment, components such as the main link 56 related to the walk-in operation and the tilt-down operation are integrated as a unit on the basis of the base member 51. Thus, mountability to the lower arm 2 is improved.

In the second embodiment, the main link 56, the sub link 57 and the cable link 63 may be positioned in a manner where the rotational axis (hinge pin 55) of the main link 56, the rotational axis (hinge pin 55) of the sub link 57 is coaxial to the rotational axis (hinge pin 62) of the cable link 63.

In the second embodiment, the design reference position of the main link 56 may be set at a central position of the actuation range of the main link 56 in accordance with the moving range of the sensor pin 60 within the long hole 54.

The present invention may be applied to a vehicle seat apparatus provided at a front seat, or may apply to a vehicle seat apparatus provided at the second row of a vehicle which has three line seats like a mini-van.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle seat apparatus comprising:
   a lower arm;
   an upper arm being rotatable relative to the lower arm in a front-rear direction of a vehicle seat;
   a pressing member fixed at the upper arm;
   a base member fixed at the lower arm;
   a first link supported by the base member so as to be rotatable and having a stopper pin positioned on a rotation path of the pressing member when a walk-in operation is performed and positioned out of the rotation path of the pressing member when a tilt-down operation is performed; and
   a second link rotatably supported by the first link and maintaining the stopper pin so as to be one of on and out of the rotation path of the pressing member, the second link being provided in a manner where a rotational axis thereof is coaxial to a central axis of the stopper pin.

2. The vehicle seat apparatus according to claim 1 further comprising:
   a pin provided at the second link;
   a bracket fixed at the base member and including an engagement concave portion at which the pin engages when the stopper pin is positioned one of on and out of the rotation path of the pressing member; and
   a biasing means applying a biasing force to the second link so that the pin of the second link engages the engagement concave portion of the bracket.

3. The vehicle seat apparatus according to claim 2, wherein a design reference position of the first link for regulating one of a walk-in standby state and a tilt-down standby state is set at an approximately central position within an actuation range of the first link.

4. The vehicle seat apparatus according to claim 1, wherein a design reference position of the first link for regulating one of a walk-in standby state and a tilt-down standby state is set at an approximately central position within an actuation range of the first link.

5. The vehicle seat apparatus according to claim 1, wherein an engaging piece bending in a seat width direction is formed at the first link.

6. A vehicle seat apparatus comprising:
   a lower arm;
   an upper arm being rotatable relative to the lower arm in a front-rear direction of a vehicle seat;
   a base member fixed at the lower arm;
   a first link rotatably supported by the base member and functioning as a stopper when a walk-in operation is performed;
   a second link rotatably supported by the base member and unlocking a lock mechanism of a seat slide mechanism; and
   a third link rotatably supported by the base member and executing one of a tilt-down operation when the vehicle seat apparatus is in a walk-in state and the walk-in operation when the vehicle seat apparatus is in a tilt-down state, wherein the first link, the second link and the third link are positioned so as to be coaxially rotatable relative to a rotational axis thereof.

7. The vehicle seat apparatus according to claim 6 further including:

a hinge pin fixed at the base member and supporting the first link, the second link and the third link so as to be rotatable relative to the rotational axis thereof and so as not to move in an axial direction of the rotational axis thereof; and a flange formed at the hinge pin and positioned between selected two links of the first link, the second link and the third link.

8. The vehicle seat apparatus according to claim 7, wherein a design reference position of the first link for regulating one of a walk-in standby state and a tilt-down standby state is set at an approximately central position within an actuation range of the first link.

9. The vehicle seat apparatus according to claim 6, wherein a design reference position of the first link for regulating one of a walk-in standby state and a tilt-down standby state is set at an approximately central position within an actuation range of the first link.

10. The vehicle seat apparatus according to claim 6, wherein an engaging piece bending in a seat width direction is formed at the first link.

11. The vehicle seat apparatus according to claim 6, wherein a long hole is formed at the second link so as to be in an arch shape.

12. The vehicle seat apparatus according to claim 6, wherein the first link and the second link rotate relative each other.

13. The vehicle seat apparatus according to claim 6, wherein an extending portion is formed in an arm shape at the second link.

14. The vehicle seat apparatus according to claim 13, wherein a connecting link is connected at the extending portion in order to make a reciprocate movement in accordance with a rotation of the second link.

* * * * *